(No Model.) 2 Sheets—Sheet 1.
N. W. PRATT & M. W. SEWALL.
FIRING VALVE CONTROLLING MECHANISM FOR PNEUMATIC GUNS.
No. 430,086. Patented June 10, 1890.
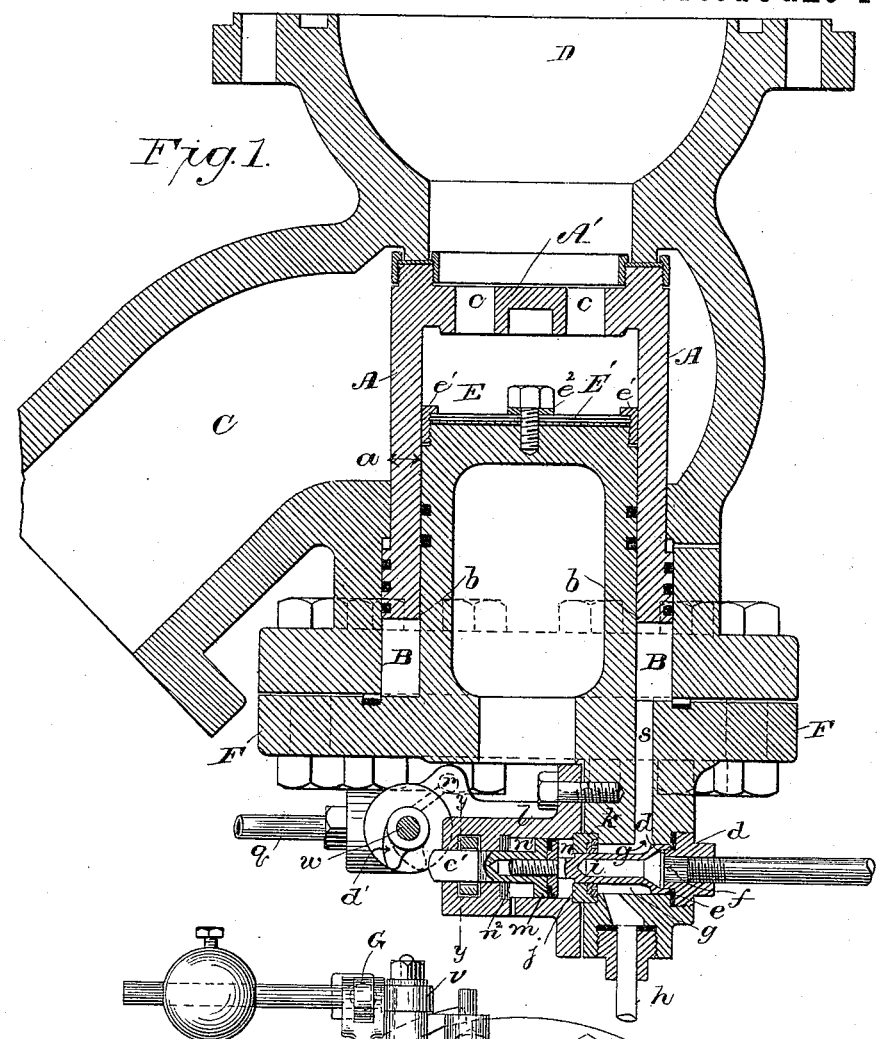
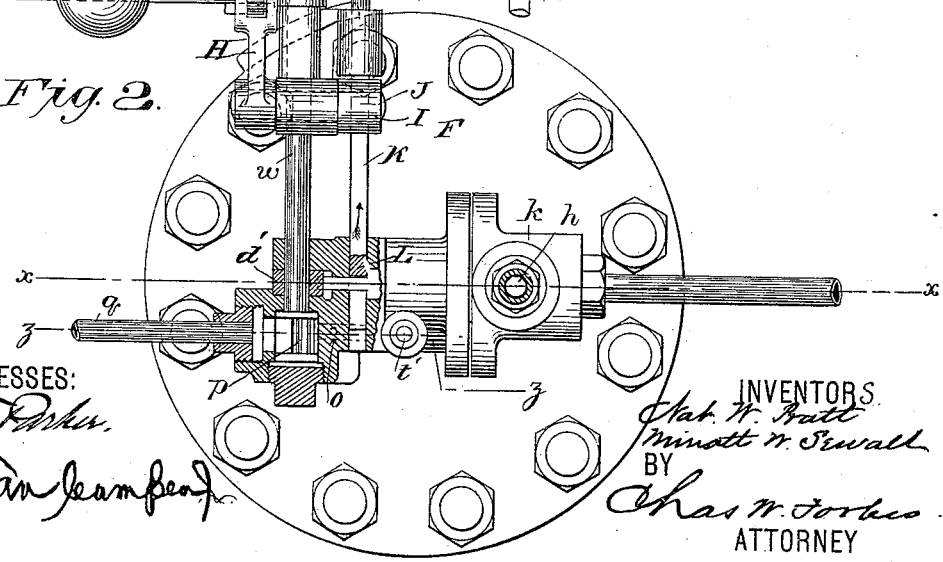
WITNESSES:
INVENTORS (No Model.) 2 Sheets—Sheet 2.

N. W. PRATT & M. W. SEWALL.
FIRING VALVE CONTROLLING MECHANISM FOR PNEUMATIC GUNS.

No. 430,086. Patented June 10, 1890.

WITNESSES: INVENTORS
Nat. W. Pratt
Minott W. Sewall
BY
Chas. N. Forbes
ATTORNEY

UNITED STATES PATENT OFFICE.

NAT. W. PRATT, OF BROOKLYN, AND MINOTT W. SEWALL, OF NEW YORK, N. Y.

FIRING-VALVE-CONTROLLING MECHANISM FOR PNEUMATIC GUNS.

SPECIFICATION forming part of Letters Patent No. 430,086, dated June 10, 1890.

Application filed December 11, 1888. Serial No. 293,237. (No model.)

*To all whom it may concern:*

Be it known that we, NAT. W. PRATT, of Brooklyn, county of Kings, State of New York, and MINOTT W. SEWALL, of the city, county, and State of New York, citizens of the United States, have invented certain new and useful Improvements in Firing-Valve-Controlling Mechanism for Pneumatic Guns, of which the following is a specification.

This invention relates to mechanism for promoting accurate automatic control over the period of compressed firing-fluid discharge from the storage source to the gun-barrel of a pneumatic gun, in order to predetermine thereby the range of the projectile to an accurate degree for a given angle of elevation of the gun-barrel; and the object of the invention is to so construct the said mechanism as to perfect its action and insure the accuracy of the several responsive automatic movements employed in its operation, and to render such movable parts as are exposed to pressure pressure-tight with a minimum of frictional resistance.

To these ends the invention consists of the herein-described specific devices, the same being employed to regulate the action of the firing-valve to deliver the compressed fluid in predetermined quantities, said quantities being variable at will irrespective of the control of the operator during the act of firing.

In order to enable others skilled in the art to which our invention appertains to understand and use the same, we will proceed to describe the details of its construction, explain its operation, and set forth in the appended claims its novel characteristics.

Figure 3:
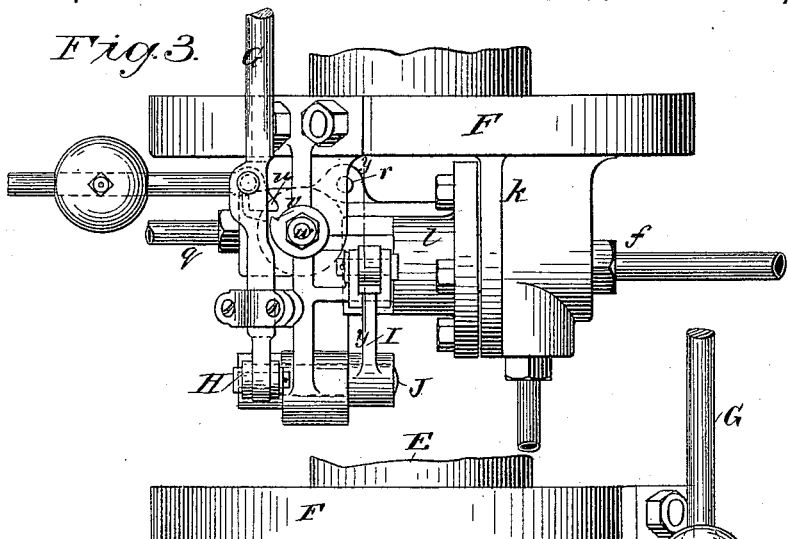
Figure 4:
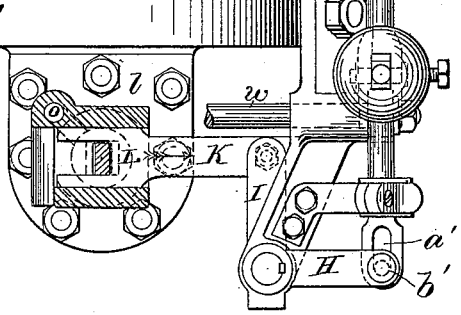

Referring to the accompanying drawings, in which like letters of reference indicate like parts throughout the several views, Figure 1 is a sectional elevation of the firing-valve-controlling mechanism on the line $x\,x$, Fig. 2; Fig. 2, an inverted plan view, partly in section, of Fig. 1; Fig. 3, an exterior elevation of the controlling mechanism, viewed from the same direction as Fig. 1; Fig. 4, an elevation of the controlling mechanism, partly in section, on line $y\,y$, Figs. 1 and 3, viewed from a direction at right angles to Fig. 3 and from the left of said figure; and Fig. 5, an elevation of the controlling mechanism, partly in section, on the line $z\,z$, Fig. 2, viewed from the reverse side from that of Figs. 1 and 3.

The present controlling mechanism is applicable to any pneumatic-gun-firing valve wherein a predominating reservoir or firing pressure area in an independent chamber upon said valve holds the same normally closed as against the firing-fluid, but permits its opening automatically upon reduction of said independent chamber-pressure, the said chamber being therefore herein termed the "firing-valve-actuating chamber." As a most appropriate form of firing-valve, however, for the purpose of present illustration, we have shown herewith the plunger-valve A, Fig. 1, which is an annular valve (having openings at $c$) presenting a given area at $a$ to the firing-fluid and a predominating pressure area at $b$ to the same fluid employed in the separate actuating-chamber B.

E is a stationary core forming an inter-prolongation of the head F of the valve-casing, and giving a pressure-tight bearing-surface to the interior of the valve A, the latter sliding pressure-tight also at its exterior contact-surfaces, as shown. The stationary core E is provided with a buffer-cushion E', secured thereto by the circumferential screw-ring $e'$ and central bolt and washer $e^2$, and adapted to receive the force of concussion incident to the quick opening of the valve A by abutment of its crown part A'. C connects to the storage-reservoir and D to the gun-barrel, the reservoir-pressure therefore surrounding the plunger A, the diameter of the seating end whereof is in excess of the exterior margin of the valve-seat and therefore permits the first starting of the valve from its seat by means of said pressure.

In the automatic firing-valve-operating mechanism herein we employ the piston exhaust-valve $d$, having a cup-shaped seating end fitting the seat $e$ around the exhaust-opening $f$, controlling the discharge of actuating-chamber pressure through the port $s$ into said opening $f$, and also sliding pressure-tight in the cylindrical chamber $g$, so as to control communication between its permanently-charged side therein from the induction-pipe $h$, (which latter is connected to the firing-pressure reservoir,) and the port $s$ of the actuating-chamber B. The stem $i$ of the exhaust-valve extends pressure-tight through the fixed bushing or diaphragm $j$, held in place between the sections $k$ $l$ of the valve-casing, and upon the end of said stem is secured the operating-piston $m$, sliding pressure-tight in the cylindrical chamber $n$. The piston $m$ is of a greater diameter than the piston-valve $d$, and the chamber $n$ communicates through the port $o$, Figs. 4 and 5, to the cut-off valve $p$, Figs. 2 and 5, controlling the communication of said port $o$ alternately with firing-pressure through the pipe $q$, (the latter connected to the reservoir,) and to exhaust to the atmosphere through the port $r$. The port $r$ is preferably made adjustable in its capacity for permitting escape, as by means of a suitable port-cramping screw-plug, the same forming no part of the present invention.

Figure 5:
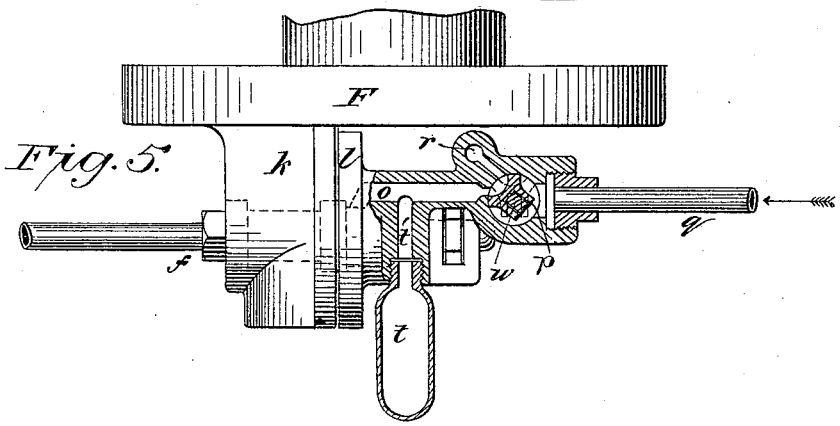

The chamber $t$, Fig. 5, constitutes an enlargement of the port $o$, provided for the purpose of increasing the volume of fluid therein to be discharged.

The chamber $n'$, back of the piston $m$, is provided with a buffer-cushion $n^2$ for receiving the force of the piston-valve opening stroke.

The cut-off valve $p$ is operated in the one direction by means of a hand-operated tappet engagement, and automatically operated in the other by means of a separate tappet engagement with the exhaust-valve stem upon the release of the herein-described latch mechanism for retaining said stem, the parts being shown to best advantage by Figs. 2, 3, and 4, in which G is the firing-rod, operated from any suitable handle or hand-lever above, accessible to the gunner, so as to fire by a downward thrust of said rod. The rod G is provided with a counterbalanced pawl $u$, (or a spring-pawl,) which engages during the first portion of the downward stroke of said rod with the charging-tappet $v$ upon the end of the valve-stem $w$ of the cut-off valve $p$, so as to rotate the latter from its normal exhaust position shown in Figs. 1 and 5 to its charging position shown by dotted lines in said figures. The pawl $u$ permits the preparatory upward movement of the rod G, passing the tooth $v$ for re-engagement with the same. The rod G also has a slotted end at $a'$, engaging during the last portion of its downward stroke with pin $b'$ on the bell-crank H I, the two arms of the latter being fixed to its shaft J, as seen in Fig. 3. The arm I connects with the latch-bar K of the latch L, so as to trip or reset the same by sliding through its slotted seat in casting $l$. The trip movement (see Fig. 2) releases the shouldered or notched valve-stem $c'$ of the piston $m$ and piston-valve $d$, and permits the same to automatically release the cut-off valve $p$, as hereinafter described, to the position of Fig. 5, by abutment against the release-tappet $d'$ on the valve rock-shaft $w$. It is of course to be understood that the reservoir passage or pipe C is intercepted by a stop-valve of usual construction, to be kept constantly open or closed in time of action or inaction of the gun.

Having thus fully described the construction of our invention, the operation of the same is as follows: The reservoir-pipe C being charged with firing-pressure, and the actuating-chamber B charged with like pressure through the pipe $h$, the firing-valve A is retained on its seat. To perform the act of firing the rod G is first lifted to latch the exhaust-valve $d$, the same being normally closed. The latch L and the several other parts thereby assume the position shown in Figs. 2 and 4. The rod G is now thrust down, which movement, by engagement of pawl $u$ with charging-tappet $v$, first sets the cut-off valve $p$, with its release-tappet $d'$, to the position indicated by dotted lines, Figs. 1 and 5, in which the port $o$ is connected to pressure-pipe $q$ and the exhaust-passage $r$ severed therefrom. The chamber $n$ is thereby charged with the reservoir-pressure applied to the exposed predominating area of piston $m$, above that of piston-valve $d$, and therefore preparatory to forcing the latter open upon release of the latch mechanism. The continued downward movement of the firing-rod G now brings the upper end of its slot $a'$ in contact with pin $b'$, tripping the latch L, rendering the pressure in chamber $n$ active, opening exhaust-valve $d$, the movement whereof throws the tappet $d'$ and cut-off valve $p$ back to the (full-lined) exhausting position shown. From this period the exhaust-valve $d$ is automatic, the pressure thereon in chamber $g$ causing its closure as soon as pressure in chamber $n$ falls sufficiently therefor, by reason of its escape under valve $p$ to and through the controllable escape or cramping valve, hereinbefore referred to, to the atmosphere. The act of opening, the period of dwell, and the act of closing of the exhaust-valve $d$ determine corresponding simultaneous movements of the firing-valve A automatically by the reduction and recharge of actuating-pressure in chamber B.

What we claim herein as our invention, and desire to secure by Letters Patent, is—

1. In a pneumatic-gun-firing valve, the main-valve piston having unequal pressure areas, a stationary guiding-core in said piston, a chamber around said piston communicating with the gas-supply at all times and with the gun when the piston is retracted, and a separate valve controlling a passage from one pressure-chamber of the piston, the named parts combined substantially as described.

2. In a pneumatic-gun-firing valve, the combination of the main valve, the controlling-valve, a cut-off for said controlling-valve, and an enlarged chamber $t$, connecting with the cut-off passage, substantially as described.

3. In a pneumatic-gun-firing valve, the combination, with the main valve, controlling-valve, and cut-off, of a hand-rod bearing a pawl engaging the cut-off when moving in one direction only, and a lock operating to hold the controlling-valve until the cut-off is shifted, said lock being unlocked by the engagement of the hand-rod after the cut-off is shifted, all combined substantially as described.

NAT. W. PRATT.
MINOTT W. SEWALL.

Witnesses:
CHAS. W. FORBES,
JOHN A. ELLIS.